United States Patent [19]

Westerman, Jr.

[11] Patent Number: 4,535,223
[45] Date of Patent: Aug. 13, 1985

[54] APPARATUS FOR USE IN TRIMMING MOLDED RECORDS

[75] Inventor: Harry H. Westerman, Jr., Middle Township, Hendricks County, Ind.

[73] Assignee: RCA Corporation, Princeton, N.J.

[21] Appl. No.: 544,830

[22] Filed: Oct. 24, 1983

[51] Int. Cl.³ .......................... H05B 1/00; B29C 17/12
[52] U.S. Cl. ...................................... 219/354; 425/810
[58] Field of Search ................... 82/1.1; 219/354, 347, 219/85 BA, 85 BM; 83/170, 171; 264/107, 161, 162, 163; 425/810, 297, 305.1, 315, 806 R

[56] References Cited

U.S. PATENT DOCUMENTS

| 1,878,070 | 9/1932 | Van Berkel | 83/170 |
| 2,670,645 | 3/1954 | Pipper | 425/810 |
| 4,235,136 | 11/1980 | Strausfeld | 425/810 |

FOREIGN PATENT DOCUMENTS

| 131753 | 2/1946 | Australia | 83/170 |
| 1407232 | 9/1975 | United Kingdom | 83/170 |

Primary Examiner—Roy N. Envall, Jr.
Assistant Examiner—Teresa J. Walberg
Attorney, Agent, or Firm—Birgit E. Morris; Edward J. Sites

[57] ABSTRACT

An apparatus is disclosed for trimming flash from molded thermoplastic records. The records which are advantageously trimmed using the apparatus of this invention have the flash secured to the outer diameter of the molded record with a web having a thickness which is substantially less than the thickness of the molded record and the principle portion of the flash. The apparatus of this invention has a rotatable turntable means for holding a record to be trimmed and a focused infrared heating means positioned relative to the turntable so as to selectively heat and soften the web prior to trimming. The softening of the web facilitates trimming the flash and the final finishing of the molded thermoplastic record.

4 Claims, 5 Drawing Figures

APPARATUS FOR USE IN TRIMMING MOLDED RECORDS

This invention relates to an apparatus for use in trimming flash from molded records. More particularly this invention is concerned with apparatus for selectively softening a portion of the flash formed on the outer diameter of a molded record during the molding process so as to facilitate trimming the flash from the record.

BACKGROUND OF THE INVENTION

Molded records, such as conventional audio records and the more recently developed capacitive electronic discs, are commonly manufactured by compression molding of a thermoplastic composition. The thermoplastic compositions used to mold records are comprised of a thermoplastic resin such as polyvinyl chloride, polyvinyl acetate, polystyrene and the like and additives such as stabilizers, lubricants and antistatic agents and carbon black. In the compression molding process a preform is initially formed which contains an amount of a thermoplastic composition which is somewhat in excess of the amount of material actually needed to mold the record in order to insure that when the record is molded it will not have any voids and will be of uniform density.

The preform is placed in a record molding press between a pair of stampers which are initially heated to an elevated temperature above the melting point of the thermoplastic composition. The molding press is then closed which causes the heated stampers to both heat the thermoplastic composition of the preform above its melting point and to cause resulting molten thermoplastic composition to flow between the stampers and thereby form the record. During the molding process the excess amount of thermoplastic composition from the preform will flow past the outer edges of the stamper and will be formed into an irregular ring of material around the molded record which is referred to as flash. After the molten thermoplastic material has been pressed between the heated stampers, the stampers are cooled which in turn causes the thermoplastic composition to solidify in the form of a record.

After the molded record is solidified the flash which was formed on the outer diameter of the record must be removed and the outer diameter of the record trimmed to a specified final diameter. Various types of trimming apparatus which are generally well known in the art can be used to remove the flash. The type of trimmers which are typically employed include, for example, scissors cutters, knife cutters, routers and the like.

A serious production problem, referred to as breakout, is encountered with all of the commonly used types of trimmers. Breakout occurs in the trimming step and in the final finishing of records when the flash does not separate cleanly from the outer diameter of the record but rather a portion of the molded record is broken out along with the flash; or the edge of the record is cracked; or other similar defects occur, all of which causes destruction of the molded record.

While the exact cause of the breakout problem is not known for certain it is believed to be due in part to the relatively brittle nature of the solidified thermoplastic compositions used in the molding of records. This appears to be true particularly with regard to the thermoplastic composition used for molding capacitive electronic discs. Capacitive electronic discs must be electrically conductive. In order to obtain the required electrical conductivity the thermoplastic compositions used to mold the capacitive electronic discs are heavily loaded with conductive carbon which causes substantial embrittlement of the solidified thermoplastic composition.

It would be highly desirable to have an apparatus which would prevent breakout during removal of the flash and the final finishing of the outer diameter of thermoplastic records.

SUMMARY OF THE INVENTION

An apparatus is disclosed for use in trimming flash from molded thermoplastic records. The records which are advantageously trimmed using the apparatus of this invention have the major portion of the flash secured to the outer diameter of the molded records with a web of uniform thickness. The web has a thickness substantially less than the thickness of the molded record and than the principal portion of the flash. The apparatus of this invention has a rotatable turntable for holding a molded record to be trimmed and a focused infrared heating means positioned relative to the turntable so as to selectively heat and soften the web prior to trimming. The softening of the web with the apparatus of the present invention facilitates the trimming of the flash and the final finishing of the molded thermoplastic record.

DETAILED DESCRIPTION OF THE INVENTION

Figure 1:
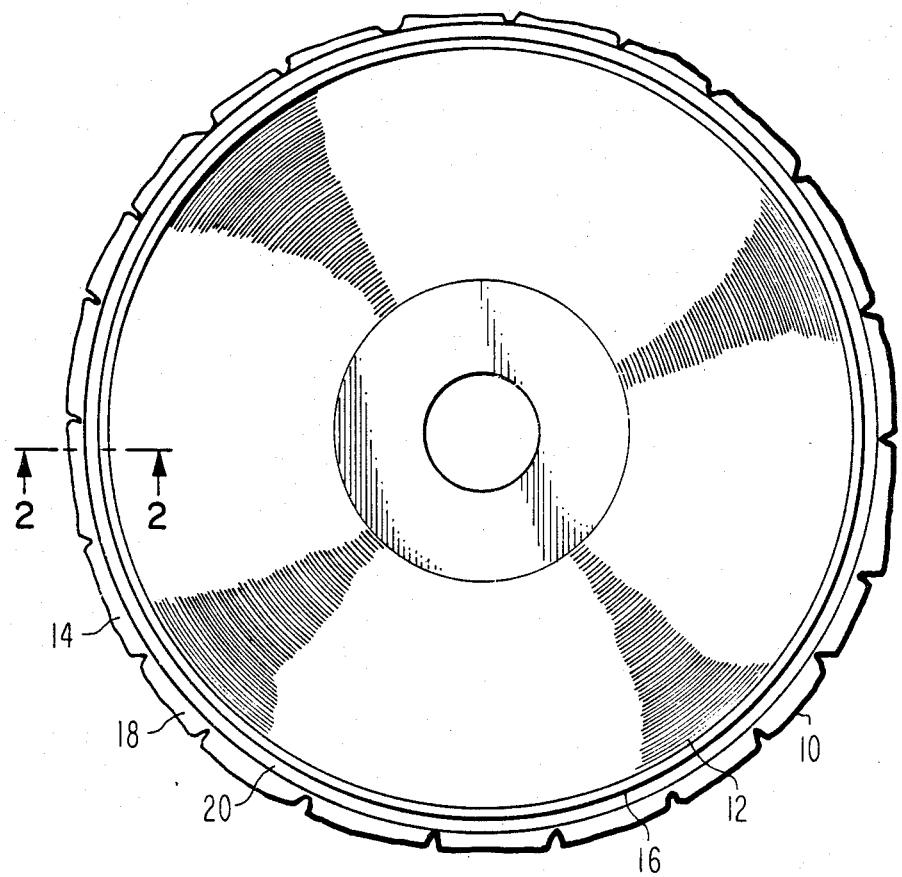
FIG. 1 is a top plan view of a molded record having the molding flash still attached to the outer diameter of the record.
Figure 2:
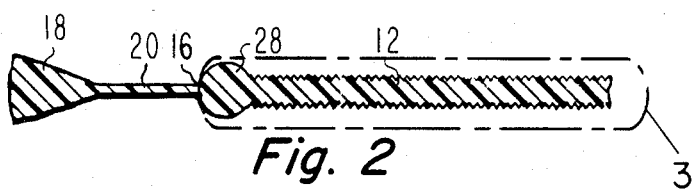
FIG. 2 is a cross-sectional view taken as indicated by the lines and arrows 2,2 on FIG. 1.

In FIG. 1 there is illustrated a typical untrimmed molded part 10 which is formed as the initial product during the compression molding of a record. The desired molded record 12 is formed in the center portion of the untrimmed molded part 10. The excess material 14 from the molding operation is attached to the outer diameter 16 of the molded record. The excess material 14 is comprised of two portions; an irregular shaped outer portion 18 and a thin band or web of material 20 which has a uniform thin cross-section as compared to both the remainder of the flash and the record 12. The band or web of material 20 is formed into a uniform thin configuration during the molding process between the land of the stampers (not shown). Generally all the excess material 14 attached to the outer diameter 16 of the molded record 12 is referred to collectively as flash. However, for purposes of facilitating a further explanation of the present invention only the outermost, irregular shaped portion 18 will be specifically referred to as flash while the flat thin band or web of material 20 which secures the flash to the outer diameter 16 of the molded record will hereinafter be specifically referred to as the web 20.

Figure 3:
FIG. 3 is an illustration in cross-section of the trimmed edge portion of the record taken as indicated by the ellipse 3 on FIG. 2.
Figure 4:
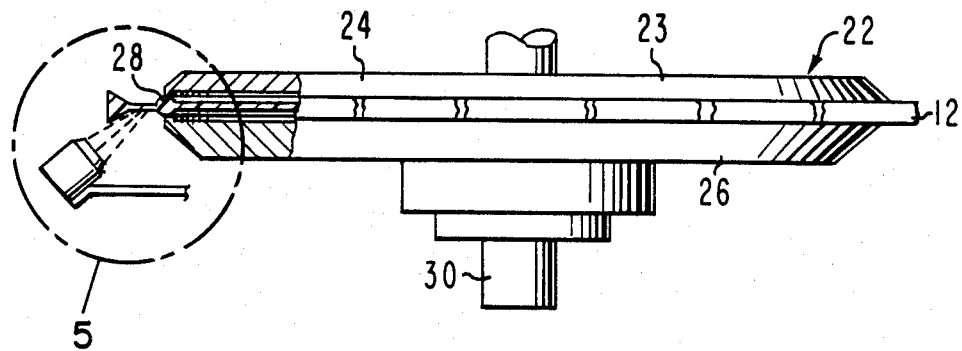
FIG. 4 is a schematic illustration in partial cross-section of the apparatus of the present invention.
Figure 5:
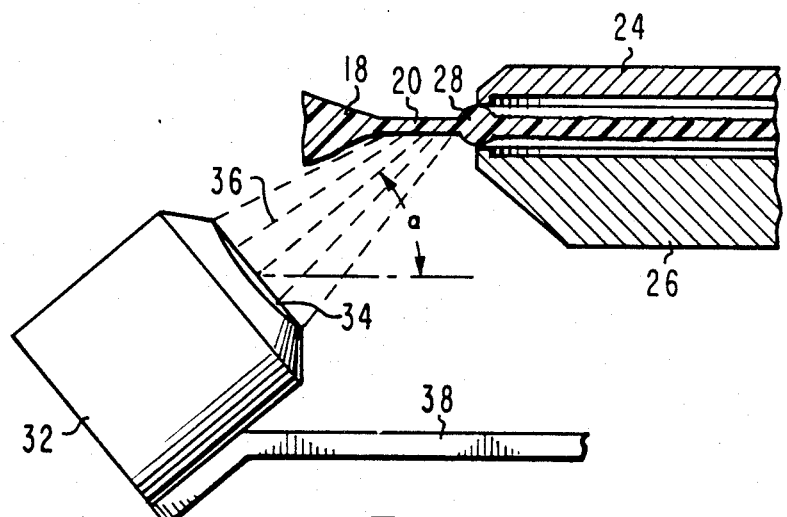
FIG. 5 is an enlarged illustration of the portion of the apparatus of FIG. 4 which is taken as indicated with the circle labeled with the number 5 on FIG. 4.

The apparatus of this invention 22 is schematically illustrated in FIG. 3. The apparatus 22 has a holding mean 23 comprised of an upper turntable 24 and a lower turntable 26 which are used to hold an untrimmed molded part 10 during the trimming process. The upper and lower turntables 24 and 26 are made of a metal such as aluminum or steel. The upper and lower turntables 24,26 are adapted to move vertically with respect to each other to allow the insertion of untrimmed parts 10 and the removal of trimmed records 12 from the holding means 23. The upper and lower turntables 24,26 have outer diameters which are approximately the same as the desired outer diameter 16 of the finished record 12 and are designed to grip the outer edge 28 of the record 12 while leaving the flash 18 and web 20 exposed for treatment in accordance with the present invention. The holding means 23 further includes a drive means 30 which is adapted to rotate both the lower turntable 26 and upper turntable 24 when an untrimmed part 10 is held between the turntables 24,26.

The apparatus 22 also includes as an essential element an infrared heating means 32 which has incorporated therewith a focusing means 34 such as a lens so that a beam of infrared light 36 from the lamp 32 can be concentrated on a small portion of the band 20 of the untrimmed part 10. The size of the area upon which the beam of infrared light is focused is selected so as to be approximately the width of the web 20 of the untrimmed part 10 and to have a length such that it only heats a small portion approximately of 2 to 6 centimeters of the web portion at a given time. The infrared heat output of the lamp 32 is selected so as to rapidly heat the thermoplastic composition of the web 20 above its softening point which generally is about 160°–165° C. Infrared heat lamps suitable for use in the present invention are commercially available.

As will be explained in greater detail below, the part to be trimmed is rotated one or more revolutions past the focused infrared heat lamp 32 during the heating process as the entire circumferential web 20 is softened. The advantage of using the infrared heat lamp 32 in this manner is that it only requires a minimal amount of equipment, that is an infrared heat lamp at one location, rather than heaters located around the entire circumference of the holding means 23 to soften the entire web 20. Because of the above arrangement, the cost of installation and the maintenance costs are considerably less than if the entire web were heated simultaneously.

The infrared heat lamp 32 is secured in a fixed position with a support means such as a bracket 38 or the like. Positioning the infrared heat lamp 32 is critical to the successful operation of the apparatus of this invention 22. The infrared heat lamp must be positioned so as to preferentially heat the web 20 as opposed to the main portion of the flash 18 or the outer edge 28 of the record 10. It should be noted that the infrared heat lamp 32 is not effective when positioned in the plane of rotation of the part to be trimmed 10, since the flash 18, being of a thicker cross-sectional configuration, will effectively block the energy of the beam 36 and the flash rather than the web 20 will be heated. The position of the infrared lamp 32 is also constrained by the path of vertical and upward and downward motion as well as the path of rotation of the upper and lower turntables 24,26. It is also preferable to have the lamp out of the immediate area in which the part to be trimmed 10 will be inserted between the turntables 24 and 26 and where the trimmer (not shown) is installed. For the combination of reasons related above and others it has been found that the most preferable location for the infrared heat lamp is below the plane of rotation of the part 10 to be trimmed positioned at a angle α of about 40° directed towards the outer diameter of the record. This position permits maximum heating about the center of the web 20 with a slight amount of heat being transferred to the flash 18 and the outer edge 28 of the record 10 and allows for the optimum heating of the web 20 for the purposes of facilitating trimming the flash 18 and the final finishing of the outer diameter 16 of the molded record 12.

In the operation of the apparatus of this invention 22 the upper and lower turntables 24,26 are initially moved vertically apart from each other so as to provide a separation between the upper and lower turntables 24,26. The part to be trimmed 10 is then centered on the lower turntable 26 with the raised outer edge 28 of the record 10 being aligned with the outer edge of the turntable 26. The upper and lower turntables 24,26 are then vertically closed towards each other so as to grip the outer edge 28 of the record 10. The motor means 30 is then activated to cause the turntables 24,26 to rotate. The infrared heat lamps 32 is then turned on while the part to be trimmed 10 is being rotated. The infrared heat lamp 32 being focused on a small portion of the web 20 softens the thermoplastic composition of the entire web 26 after one or more rotations of the turntable 24. When the web 20 has been softened a trimmer (not shown) is then used to remove the flash and to final trim the outer diameter 16 of the record. The infrared heat lamp 32 may be left on during the trimming operation if it is desired to insure that the web remains in a softened condition throughout the entire trimming operation and finishing process provided the record 12 is not heated to its softening point.

Once the trimming and finishing is completed and the infrared lamp 32 is turned off the rotation of the upper and lower turntables 24,26 is discontinued and the turntables 24,26 are then released. The final trimmed record 12 can then be removed from the lower turntable. Using the apparatus of this invention 22, when the web is softened as noted above the problem of breakout is eliminated and the final molded record 12 will have a more accurate, smoother, outer diameter 16 then was heretofore obtainable.

I claim:

1. Apparatus for use in trimming flash from an outer diameter of a record molded from a thermoplastic composition having a softening point in which the flash is secured to the outer diameter of the record by a circumferential web of thermoplastic composition, said web having a given width and a cross-sectional thickness which is substantially less than the flash and the outer diameter of the record; said apparatus comprising in combination;

(a) a holding means for receiving and holding a molded record to be trimmed, said holding means having upper and lower turntables each having outer edges for holding the record, said edges being approximately the same diameter as the outer diameter of the record, (b) means for rotating said holding means in a predetermined plane of rotation, and (c) infrared heating means for producing a beam of infrared heat, said infrared heating means further including means for focusing the infrared heating beam within a predetermined area of approximately said given width for length which is substantially less that the diameter of the web, said infrared heating means being positioned relative to said holding means whereby the infrared heating beam is focused on the web of a record to be trimmed while the record is held and rotated by the holding means:

whereby said web can be selectively heated to a temperature above the softening point of the thermoplastic resin thereby facilitating the trimming of the flash from the outer diameter of the record.

2. The apparatus according to claim 1 wherein the infrared heating means is positioned below the plane of rotation of the holding means.

3. The apparatus according to claim 1 wherein the infrared heating means is positioned so that a beam of infrared rays is focused at an angle of about 40° towards the web.

4. In the method of trimming flash from an outer diameter of a record of a predetermined thickness molded from a thermoplastic composition wherein the flash is secured to the outer diameter of the record with a circumferential web of the thermoplastic composition which has predetermined width and cross-sectional thickness which is less than the thickness of the record, the improvement which comprises: selectively heating the web above its softening point by focusing an infrared beam to provide a heating zone having a width about the width of the web and having a length substantially less than the length of the diameter of the web and rotating the record so as to cause the web to travel through said heating zone for a length of time sufficient to cause the thermoplastic composition of the web to soften but less than that required to soften the thermoplastic composition of the record.

* * * * *